United States Patent [19]

Dempsey

[11] Patent Number: 5,024,379

[45] Date of Patent: Jun. 18, 1991

[54] VARIABLE CAPACITY HEATING APPLIANCE

[75] Inventor: Daniel J. Dempsey, Carmel, Ind.

[73] Assignee: Carrier Corporation, Syracuse, N.Y.

[21] Appl. No.: 396,789

[22] Filed: Aug. 21, 1989

Related U.S. Application Data

[63] Continuation of Ser. No. 260,974, Oct. 21, 1988, abandoned.

[51] Int. Cl.⁵ .............................................. F24H 3/06
[52] U.S. Cl. ........................................ 237/16; 165/22; 236/78 D
[58] Field of Search ................. 236/11, 78 D; 165/22; 237/116

[56] References Cited

U.S. PATENT DOCUMENTS

| | | |
|---|---|---|
| 1,410,431 | 3/1922 | Wade ................................... 237/50 |
| 3,655,127 | 4/1972 | Piper ................................... 237/8 R |
| 4,009,825 | 3/1977 | Coon ................................... 236/1 ER |
| 4,549,601 | 10/1985 | Wellman et al. .................. 165/22 X |
| 4,638,942 | 1/1987 | Ballard et al. ..................... 236/10 |
| 4,688,547 | 8/1987 | Ballard et al. ..................... 126/116 A |
| 4,727,727 | 3/1988 | Reedy ................................. 62/238.6 |
| 4,811,897 | 3/1989 | Kobayashi et al. .............. 165/22 X |

Primary Examiner—William E. Wayner
Attorney, Agent, or Firm—Dana F. Bigelow

[57] ABSTRACT

A heating system with a hot water coil is provided with a variable speed blower whose speed is regulated in response to a sensed load in the system. Heat can therefore be added to the hot water by way of a simple burner system, with the required control being effected by selectively varying the amount of heat that is removed from the hot water by controlling the fan speed. When applied to a zone controlled system, the need for a bypass duct is obviated.

4 Claims, 1 Drawing Sheet

U.S. Patent
June 18, 1991
5,024,379
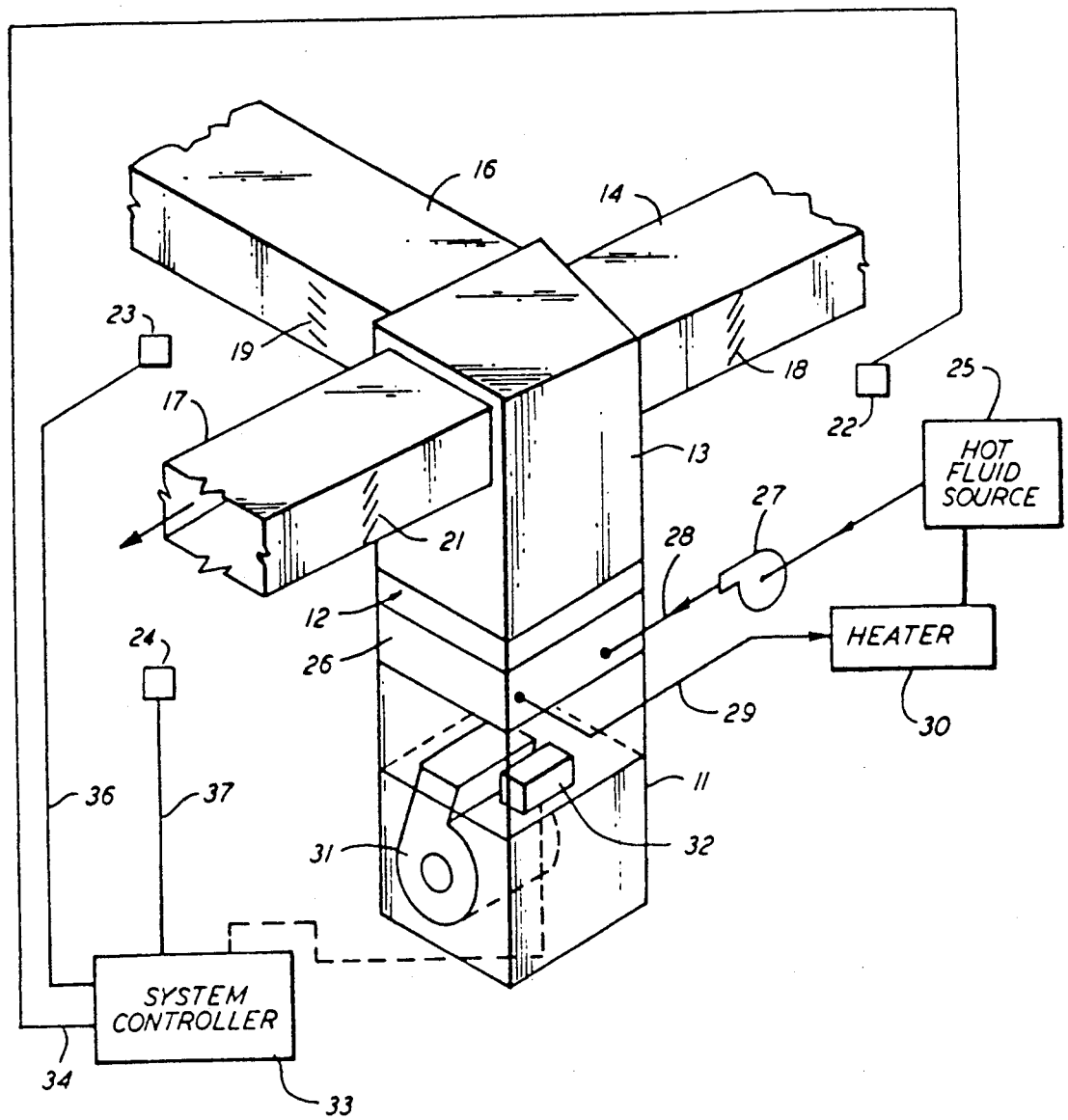

VARIABLE CAPACITY HEATING APPLIANCE

This application is a continuation of Ser. No. 07/260,974 filed 10/21/88, now abandoned.

BACKGROUND OF THE INVENTION

This invention relates generally to furnaces and, more particularly, to a method and apparatus for controlling the operation of the furnace so as to match its output with the load.

In conventional gas furnaces, it is generally required to include a limit control to protect against excessively high supply air temperatures as the airflow is decreased. Because of its ability to be modulated, the electronic furnace described in U.S. Pat. No. 4,638,942 issued on Jan. 27, 1987 and assigned to the assignee of the present invention is better adaptable to zone control air distribution systems. However, even in this system the combustion can only be modulated down to 66 percent of its full rate, since operating at any lower rate would create primary heat exchanger cold spot problems and would require improved burner turn-down capability. Also, it operates either at high or low input and is not capable of operating therebetween. Further, it requires a complex software algorithm for implementation of the combustion modulation.

In accordance with another embodiment of the above-mentioned electronic furnace, an electronically commutated motor is applied to drive the circulating air blower at variable speeds to obtain a constant temperature rise for all steady state operating conditions. Such a system is described in U.S. Pat. No. 4,688,547 issued on Aug. 25, 1987 and assigned to the assignee of the present invention. However, it should be recognized that in this system a limit switch is required to guard against excessive heat exchanger and supply air temperatures, such as when the blower operates against extremely high static pressures, and is unable to maintain a fixed airflow.

In a zone controlled system, it is necessary to have a blower that is sized to provide a minimum amount of air to the system when all of the dampers are open. When the set points of certain areas are met, the associated dampers are closed and, in order to accommodate the increased static pressure in the remaining ducts, it is generally necessary to provide a bypass duct. The need for such a duct is not only cause for added expense, but also tends to decrease the efficiency of the system.

Fixed-rate integrated space heat/domestic hot water heating systems are now becoming relatively common. Such a system is shown in U.S. Pat. No. 4,727,727 issued on Mar. 1, 1988. The principle is to circulate stored potable hot water to the fan coil, over which a fixed speed blower circulates air to be warmed and distributed to the spaces. One of the advantages of such a system is that the supply air delivered to the space to be heated cannot be hotter than the water circulated from the storage tank. Thus, as circulating airflow decreases, supply air temperature will approach an upper limit equal to the storage tank water temperature.

Despite the advantage of the inherent temperature limiting feature of such a system, the storage tank, water heater, pump, fan coil, and circulating air blower are typically sized for a fixed heat output. For instance, a system designed to provide 30,000 BTUH space heating and 800 CFM for a two-ton air conditioner would have components sized accordingly. Thus, when a call for heat is made, the system has relatively high output until that demand is met and then it is turned off and remains off until the temperature drops to a predetermined lower level at which time the system is then turned on to the relatively high output again. Such a system is thus relatively noisy since it operates only at a relatively high speed. Further, the level of comfort provided is somewhat minimized by the temperature swing that is produced by fixed output heating appliances when cycled on/off at full capacity.

It is therefore an object of the present invention to provide an improved heating system which does not require a limit control to protect against excessive heat exchanger thermal stress and high supply air temperatures when the airflow volume decreases.

Another object of the present invention is the provision of an improved heating system that is adaptable to zone controlled air distribution systems but does not require a bypass duct.

A further object of the present invention is an improved heating system that does not require a complex modulating combustion system.

Still another object of the present invention is the provision for an improved heating system wherein heat exchanger cold spot corrosion is avoided.

Yet another object of the present invention is the provision for an improved heating system which is quiet in operation while maintaining the temperature of a space to be heated within a relatively narrow temperature range.

These objects and other features and advantages become more readily apparent upon reference to the following description when taken in conjunction with the appended drawings.

SUMMARY OF THE INVENTION

Briefly, in accordance with one aspect of the invention, a heating system with a hot fluid filled coil and associated blower is provided with a variable speed drive for the blower, and the speed is regulated in response to the sensed load in the system. In this way, the fan can be selectively operated over a continuous range of speeds to thereby maximize the efficiency and comfort of the system and maintain the temperature within a narrow range.

By yet another aspect of the invention, the heating system is incorporated into an integrated heating system wherein the heated fluid being supplied to the heat exchanger is supplied at a substantially constant temperature. The temperature of the fluid returning from the heat exchanger is therefore dependant on the speed at which the blower is running, and the time that the fluid heater burner comes on, and the duration which it stays on, may vary accordingly. However, in a system with a hot water storage tank, the burner can be a simplified on/off burner without a requirement for modulation. If a radiant burner, with no storage tank, is used, modulation would be required.

By yet another aspect of the invention, the heating system can be incorporated into a zone control air distribution system wherein airflow can be selectively controlled by operation of various dampers, and as the load is reduced, the speed of the fan will in turn be reduced. In this way, the need for a bypass duct is obviated.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a schematic illustration of the present invention.

DESCRIPTION OF THE PREFERRED EMBODIMENT

Referring now to FIG. 1, there is shown an electrical appliance or furnace 11 having a discharge opening 12 fluidly connected to a mixing box 13 which, in turn is fluidly connected to deliver heated air to a plurality of ducts, indicated at 14, 16 and 17 for carrying the heated air to various zones within a building. As is typical with conventional zoned systems, each of the ducts 14, 16 and 17 have associated dampers, indicated at 18, 19 and 21, respectively, and thermostats indicated at 22, 23 and 24, respectively. The dampers 18, 19 and 21 are selectively operated to vary the flow of the heated air to the respective zones in response to the thermostat setting within the zones and the sensed temperature conditions therein.

The furnace 11, rather than having a burner or an electrical resistance coil as in conventional furnaces, contains a fluid/air heat exchanger 26 located in or near the furnace discharge opening 12 as shown. Within one circuit of the heat exchanger 26, a flow of heated fluid is passed therethrough as indicated by the arrows, with the fluid being circulated by way of a circulating pump 27 into the heat exchanger inlet tube 28, through the heat exchanger 26, out the outlet tube 29 and to a heater 30. The source 25 of fluid to be circulated through the heat exchanger 26 is preferably a tank with hot water or a glycol solution, which is maintained at a predetermined temperature. Alternately, a modulated radiant burner may be applied to produce a constant temperature water source without the use of a storage tank. The heated fluid passing to the heat exchanger 26 is therefore maintained at a predetermined temperature and the fluid passing back to the heated fluid supply is at a lower temperature, with the associated temperature drop being determined by the amount of heat that is removed at the heat exchanger 26 for purposes of providing heat to the various zones. In turn, the amount of heat removed at the heat exchanger is determined in part by the amount of airflow thereover.

In order to selectively vary the amount of heat introduced into the system by way of the heat exchanger 26, the amount of air passing over the heat exchanger 26 is selectively varied by way of a variable speed circulating air blower 31. The variable speed blower may be any of various types such as, for example, an electronically commutated motor driven blower as shown and described in U.S. Pat. No. 4,638,942 mentioned hereinabove. The speed of the blower motor is varied in response to signals from the fan coil/blower controller 32, which in turn receives control signals from a system controller 33.

The system controller 33 receives inputs from the thermostats 22, 23 and 24 by way of lines 34, 36 and 37, respectively. In response to these signals, the system controller 33 determines the load in the system and varies the speed of the circulating air blower 31 in response thereto. In general, the system will operate over longer periods of time, and with lower air blower speeds, than the conventional single or multiple speed furnace having electrical or fossil fuel heaters. For these reasons, the system will tend to be quieter in operation and will tend to provide greater comfort because of the relatively consistent speeds of operation.

Returning now to the discussion of the system controller 33, which can be located either within the furnace control, at a remote location, or as part of a master zone thermostat, it should be understood that the manner in which it determines the zone capacity requirements can be accomplished in any of a number of ways. For example, on the basis of signals received from each of the thermostats 22, 23 and 24, the controller 33 is able to determine the thermostat setting (i.e. the demand) as well as the actual temperature in that zone at any one time. By making these inquiries in relatively short increments of time, the needed change in system capacity can be determined by the controller 33. For example, if the thermostat readings are taken six consecutive times over a period of two minutes (i.e. every 20 seconds), then the sum of thermostat error (ERRSUM) can be calculated, with the previous ERRORSUM being stored as an old error sum (OLDSUM). The needed change in system capacity can then be determined by the following equation:

$$\text{Needed Capacity Change} = \quad \text{Eq. (1)}$$
$$PCNT(ERRSUM - OLDSUM) +$$
$$ICNT(ERRSUM) \text{ Where } PCNT \text{ equals } 20\%/°F. =$$
$$\text{Proportional gains factor } ICNT \text{ equals } 1.2\%/°F. - \text{min.} =$$
$$\text{Normal integral gain factor}$$

The above control equation can be applied to determine the change in system capacity needed to meet and hold the building load. The new system capacity can then be defined by the following equation:

$$\text{New System Capacity} = \text{System Capacity} + \text{needed Capacity Change.} \quad \text{Eq. (2)}$$

Where System Capacity is limited to the range of 0 to 100% in the heating mode

Another method of determining zone capacity requirements would be to simply record the length of sequential on/off cycles of the on/off thermostat. The required capacity, expressed as a percent of the load, would be a function of the cycle'(s) percent on time.

Once the required system capacity is determined as a percent of the load, a required blower speed can then be determined in one of various ways. One method would be to simply multiply the full load blower speed by the percent of full load capacity determined by the system controller. That is: RPM desired=RPM full load×% load/100.

This method, in its simplicity, does not linearly vary the heating capacity in the system. That is, a blower speed as determined in this manner may result in slightly more or less air than is truly required for a given load. Thus, if greater linearities in the control method are desired, the direct measurement method described hereinbelow would be preferred.

A second method of blower speed determination involves the use of a blower coastdown algorithm, similar to that described in U.S. patent application Ser. No. 144,682, filed on Jan. 13, 1988, and assigned to the assignee of the present invention, to relate airflow (CFM) to blower speeds (RPM). With this method, the percent of full load capacity, as determined by the system controller in the manner described hereinabove, is multiplied by the full load airflow. The coastdown method is then applied to determine the blower speed required to provide the necessary airflow.

Another approach to determining blower speed provides a more direct means of heating capacity, and involves the use of heat transfer relationships for a given heat exchanger design. Using this approach, the system heating capacity 4 can be determined by the equation:

$$U = M \times Cp \times (Tout - Tin) \qquad \text{Eq. (3)}$$

Where  $M$ = air mass flow rate (lbm/hr)
$CP$ = specific heat (Btu/lbm)$F$
$Tout$ = supply air temperature (°F.)
$Tin$ = return air temperature (°F.)

Since we know from well known principles that:

$$M = CFM \times p \times 60 \qquad \text{Eq. (4)}$$

where:  $CFM$ = airflow air rate (ft$^3$/minute)
$P$ = air density (lbm/ft$^3$)
60 = minutes per hour;

Assuming p=0.075 lbm/ft$^3$ and Cp=0.24 btu/lbm F, then the above equation can be written as $$Q = 1.08 \times CFM \times (Tout - Tin). \qquad (5)$$

For a given flow rate (CFM), Tout is a function of heat exchanger design and effectiveness. Once the design is selected, additional heat transfer equations can be developed that relate Tout to CFM. The result is a logarithmic equation relating airflow (CFM) to heat capacity (Q).

The system controller determines the percent of full load capacity required to satisfy the demand by the zone(s):

$$\% \text{ full load} = Q/Q \text{ max.} \qquad \text{Eq. (6)}$$

For a given heat exchanger design, where Q max. is full load capacity, the controller determines the required heat capacity and solves the preprogrammed heat transfer relationship for CFM. The coastdown technique determines the blower speed required to provide the necessary airflow.

While the present invention has been disclosed with particular reference to a preferred embodiment, the concepts of this invention are readily adaptable to other embodiments, and those skilled in the art may vary the structure thereof without departing from the essential spirit of the invention.

What is claimed is:

1. In a heating system of the type having a heater for selectively adding heat to a first fluid for maintaining its temperature at a predetermined level, and a heat exchanger connected thereto for receiving a flow of said first fluid at said predetermined temperature and returning a flow thereof at another cooler temperature, an improved temperature control system comprising:
 a fan for circulating a second fluid over said heat exchanger to facilitate the transfer of heat to said second fluid for delivery to a distribution system downstream thereof, said fan being capable of operating over a continuous and wide range of speeds;
 means for determining, over a continuous range, the heating load requirements of said downstream distribution system; and
 means for varying the speed of said fan in response to said heating load requirements, wherein said means for determining the heating load requirements comprises:
 at least one thermostat for determining the thermostat error in said downstream distribution system; and
 a controller for calculating the needed change in system capacity as a function of said thermostat error, and for further determining a new system capacity as a function of an old system capacity modified by said needed capacity change.

2. The improved temperature control system as set forth in claim 1 and including an on/off thermostat and further wherein said means for determining the heating load requirements comprises:
 recording means for recording the length of sequential on and off cycle times of said thermostat; and
 a controller for calculating the required capacity, in terms of percent of full load, as a function of the cycle(s) percent of time.

3. An improved heating system of the type having a heat exchanger with heated fluid being supplied thereto at a substantially constant temperature and a fan for passing air there-over to be heated and distributed to a space comprising:
 load sensing means for measuring over a continuous range, the heating load of the space; and
 speed control means for varying the speed of the fan in response to said load sensing means such that the amount of air passing over the heat exchanger is substantially proportional to the space heating load;
 wherein said load sensing means comprises at least one thermostat for determining the thermostat error in the space; and a controller for calculating the needed change in system capacity as a function of said thermostat error, and for further determining a new system capacity as a function of an old system capacity modified by said needed capacity change.

4. A method of controlling a heating system of the type having a heat exchanger with heated fluid being supplied thereto and a fan for passing air there-over to be heated and distributed to a space comprising the steps of:
 sensing, over a continuous range, the load requirements of space to be heated; and
 controlling the speed of the fan, over a continuous range, in response to said load requirements such that the amount of air passing over the heat exchanger is substantially proportional to said load requirements;
 wherein said step of sensing the load requirements of the space is accomplished by the following steps:
 providing at least one thermostat for establishing a desired set temperature in the space and for repeatedly measuring the actual temperatures therein;
 sequentially calculating the thermostat errors to obtain sequential old and new errors;
 calculating a needed system capacity change as a function of said sequential old and new errors;
 determining a new system capacity as a function of an old system capacity plus the calculated needed system capacity change.

* * * * *